(12) United States Patent
Trachy et al.

(10) Patent No.: US 11,829,257 B2
(45) Date of Patent: Nov. 28, 2023

(54) SECONDARY STORAGE PROTECTION

(71) Applicants: David Lee Trachy, Longmont, CO (US); Joshua Daniel Carter, Lafayette, CO (US)

(72) Inventors: David Lee Trachy, Longmont, CO (US); Joshua Daniel Carter, Lafayette, CO (US)

(73) Assignee: Spectra Logic Corporation, Boulder, CO (US)

(*) Notice: Subject to any disclaimer, the term of this patent is extended or adjusted under 35 U.S.C. 154(b) by 0 days.

(21) Appl. No.: 18/198,897

(22) Filed: May 18, 2023

(65) Prior Publication Data

US 2023/0289265 A1 Sep. 14, 2023

Related U.S. Application Data

(63) Continuation of application No. 17/964,850, filed on Oct. 12, 2022, now Pat. No. 11,687,417.

(60) Provisional application No. 63/257,516, filed on Oct. 19, 2021.

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01); *G06F 2201/84* (2013.01)

(58) Field of Classification Search
CPC ............. G06F 11/1464; G06F 11/1451; G06F 11/1461; G06F 2201/84
See application file for complete search history.

(56) References Cited

U.S. PATENT DOCUMENTS

| | | | |
|---|---|---|---|
| 7,191,290 B1* | 3/2007 | Ackaouy | G06F 16/9574 711/119 |
| 7,991,791 B1 | 8/2011 | Chen et al. | |
| 3,024,601 A1 | 9/2011 | Kambara et al. | |
| 8,706,833 B1* | 4/2014 | Bergant | G06F 16/1756 709/215 |
| 8,949,312 B2 | 2/2015 | McLoughlin et al. | |
| 11,409,348 B2* | 8/2022 | Suljic | G11C 5/141 |
| 2015/0113239 A1* | 4/2015 | Katori | G06F 3/065 711/162 |
| 2017/0316075 A1* | 11/2017 | Deshmukh | H04L 63/08 |
| 2020/0133802 A1* | 4/2020 | Srinivasan | G06F 11/008 |
| 2020/0364113 A1* | 11/2020 | Tormasov | G06F 11/1461 |

* cited by examiner

*Primary Examiner* — Jigar P Patel
(74) *Attorney, Agent, or Firm* — Kenneth Altshuler

(57) ABSTRACT

Due to the threat of virus attacks and ransom ware, an apparatus and methods for protecting backup storage devices from malicious software virus attacks is explored. An independent backup storage system is connected to a primary storage server over an undiscoverable communications line. The backup storage system is a read-only backup storage system most of the time buffering the backup storage system from a virus or attack on the primary storage server. The backup storage system changes from a read-only backup storage system to a read/write backup storage system only during a backup window of time where data is backed up to the backup storage system. A snapshot of the backup data is maintained in the backup storage system and can be made available at numerous points of time in the past if the data primary storage server becomes corrupted.

20 Claims, 9 Drawing Sheets

SECONDARY STORAGE PROTECTION

CROSS-REFERENCE TO RELATED APPLICATIONS

This application claims priority to and the benefit of U.S. patent application Ser. No. 17/964,850, entitled Secondary Storage Protection filed on Oct. 12, 2022, which claims priority to and the benefit of U.S. Provisional Patent Application Ser. No. 63/257,516, entitled Secondary Storage Protection filed on Oct. 19, 2021.

FIELD OF THE INVENTION

The present embodiments are directed to protecting backup storage devices from malicious software virus attacks.

DESCRIPTION OF RELATED ART

Information technologies are facing grave threats in the way of ransomware attacks. Just in the last couple of years, two major attacks have made international news. For example, the Colonial pipeline attack in May 2020 resulted in a disruption of oil distribution while the attack on JBS meat packing in June 2021 effected meat supplies available in grocery stores nationwide.

When IT personnel consider protecting their operations from ransomware attacks there are two-lines of defense they need to consider, preventive and recovery. Preventive defense measures deal with tools and procedures that prevent a ransomware virus to take hold within the enterprise's operations. Preventative measures include things such as implementing frequent virus scanning, firewalls, multi-factor authentication and a host of other things. It is a game of cat and mouse game with enterprise organizations fortifying preventive measures against attacks (ransomware hardening) versus ransomware creators developing ways to penetrate or get around the fortified preventative measures. Because the risk of new ransomware breaking into an enterprise's protective measures is high, if inevitable, it is wise for enterprises to invest a portion of their ransomware hardening budgets to recovery.

Recover encompasses the tools and processes an IT organization uses to recover data from a ransomware attack. The most common ransomware attack is one in which a ransomware virus reads files from the enterprise's servers and writes them back out encrypted. When an enterprise pays the ransom, they are essentially paying for the encryption key that decrypts the encrypted files restoring them to their unencrypted (original) state. However, no company wants to pay the "ransom" regardless of its cost. When a ransomware attack has taken hold, an enterprise is put into the position of either recovering the data themselves or paying the ransom. The decision to do one or the other is usually going to be decided on the recovery time objective (RTO) of the internal recovery process. This is assuming that the enterprise has a least a minimum recovery process whereby all their data is recoverable. If they do not, then this decision becomes moot as they probably have no other choice but to pay. Even when all data is recoverable, the data may not be recoverable within an RTO that is acceptable for the business. As an example, if backups have been done to tape but it is estimated that it will take two weeks to recover all the data necessary to restart operations, some modern businesses may find this unacceptable. Consider an airline not being able to fly planes or book new flights for an extended period of time. In this scenario, the airline cannot afford a lengthy RTO. Therefore, RTO has become a major driver in the development of new recovery processes.

Newer recovery process methods, as opposed to older methods, such as historical tape backup, focus on reducing the time to recovery over all other aspects of the process, most notably the cost of the solution. Innovative data protection companies like Veeam, Cohesity and Rubrick share two characteristics in common; (1) they backup data more frequently than traditional backups have been done in the past and (2) they allow for the rebooting of a business application using the backup disk target as a primary volume. This latter characteristic allows business applications to be restored to working order in a timely manner and are useful in cases where the primary volume has either been corrupted (ex: ransomware) or is no longer in working order. They further provide for incremental restoration of the primary volume back to its prior-to-failed state while the business application continues to run. Once the restoration is completed, the business application can then simply be rebooted again using the restored primary volume. These new recovery methods greatly reduce the impact of a ransomware attack on the enterprise. In order to counter this, ransomware creators need to figure out how to attack backup disk targets.

It is to innovations related to this subject matter that the claimed invention is generally directed.

SUMMARY OF THE INVENTION

The present embodiments generally relate to protecting backup storage devices from malicious software virus attacks.

In that light, certain embodiments contemplate a method for using a backup server one embodiment of the present invention envisions a method starting with the backup server storing a base backup volume of data from the primary server at a first scheduled time. The backup server takes a first snapshot of the base backup volume of data each place and then stores a first volume change, which is a first change to the base backup volume of data, as received from the primary server at a second scheduled time. The backup server then takes a second snapshot of the first volume change. The backup server is unable to be written to between the first scheduled time in the second schedule time. The base backup volume and the first volume change is immutable as soon as they are written to the backup server.

Still, another embodiment of the present invention envisions a backup system that includes at a first end, a primary storage server system connected to a backup storage appliance via a private undiscoverable connection connected, the primary storage server system connected to a public network at a second end. Here, the backup storage appliance is in possession of a generation-1 data volume that comprises a sequence of primary extents. The sequence includes a first set of changed extents corresponding to a first subset of the primary extents, and a second set of changed extents corresponding to a second subset of either the primary extents, a subset of the changed extents, or a combination of the second subset of either the primary extents and the subset of the changed extents. The system also includes a snapshot database in the backup storage appliance comprising a first snapshot of the primary extents, a second snapshot of the subset of the first set of changed extents, and a third snapshot of the second set of changed extents, the extents from only the primary storage server system. The backup storage appliance is only capable of storing the extents and taking the snapshots during scheduled read/write periods of time, between the scheduled read/write periods of time, the backup storage appliance is a read-only backup storage appliance.

In yet another embodiment of the present invention, a secure backup method is envisioned to comprise switching a backup storage appliance from being a read-only appliance to being a read/write appliance, the backup storage appliance is the read/write appliance for a designated backup window of time. The method continues with storing a backup copy of a generation-1 data volume in the backup storage appliance only during the designated backup window of time, the generation-1 data volume is divided into a plurality of extents, the backup copy received from a primary storage server system. A first snapshot is taken of the generation-1 data volume essentially immediately upon completion of the storing step. The first snapshot is maintained in a snapshot database in the backup storage appliance. Immediately after the taking step, the backup storage appliance is switched to being the read-only appliance. After a predesignated amount time, the backup storage appliance is switched from being the read-only appliance to being the read/write appliance and retaining only changed extents from the plurality of extents in the backup storage appliance, the changed extents correspond to extents from the generation-1 data volume. A second snapshot is taken of the changed extents and maintaining the second snapshot in the snapshot database, the backup storage appliance is independent from and spaced away from a primary storage server system.

DETAILED DESCRIPTION

Figure 1:
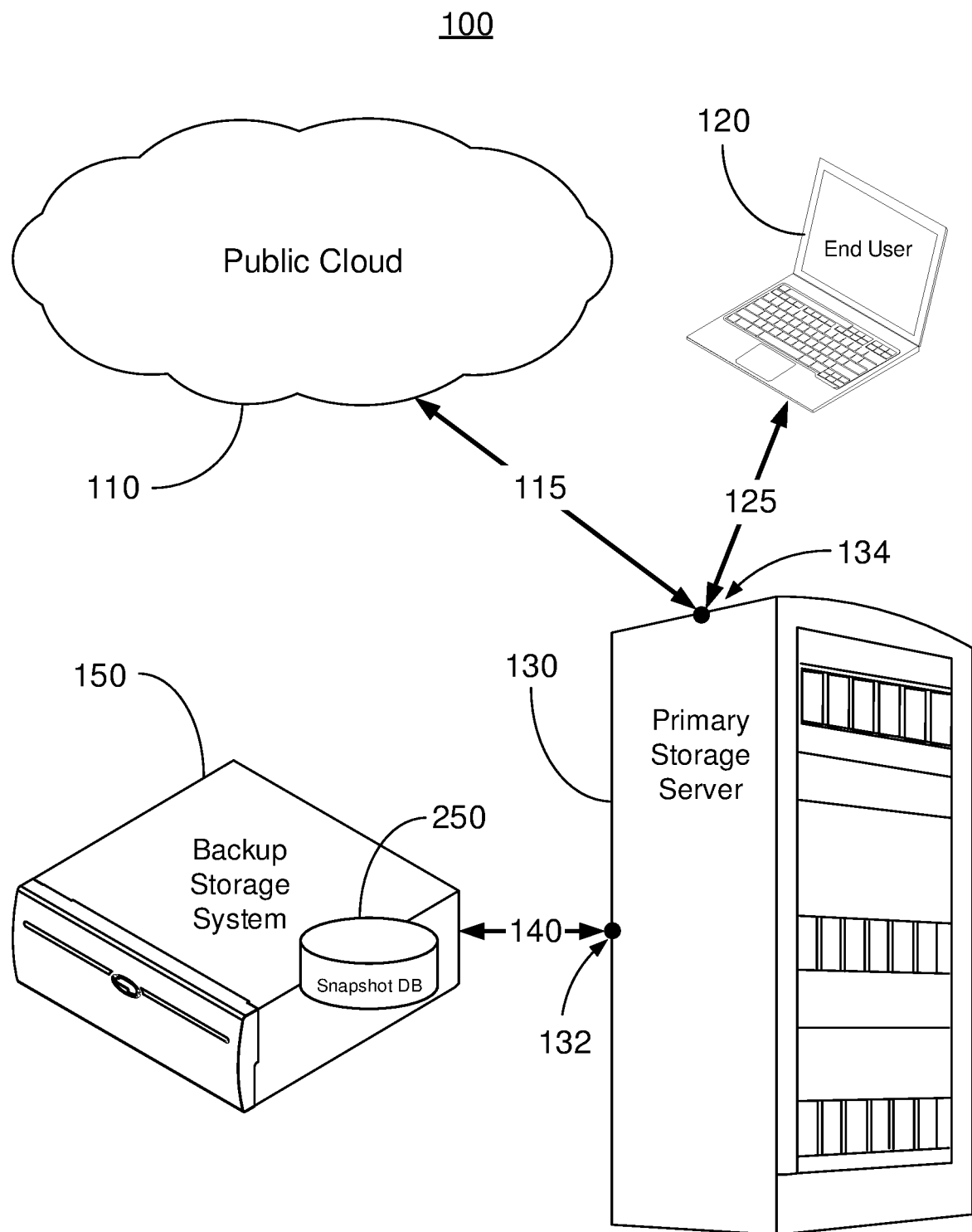
FIG. 1 is a block diagram of a storage network environment where embodiments of the present invention can be advantageously practiced.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving data protection against virus attacks or other kinds of data corruption on backup storage systems. The phrases "in one embodiment", "according to one embodiment", and the like generally mean the particular feature, structure, or characteristic following the phrase is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable margins of the normal world and is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−3% of exact. In what follows, similar or identical structures may be identified using identical callouts.

Embodiments disclosed herein are generally directed to an apparatus and methods for protecting backup storage devices from malicious software virus attacks. From a high-level perspective, a backup storage system that is independent and separate from a primary storage server is connected to a primary storage server via a secure communications line. A server is a centralized resource or service (hardware or software) in a network and as used herein is directed to enterprise use for mass storage, which differentiates from personal computing and personal devices that cannot handle the scale of data and benefit from the storage techniques disclosed for the types of systems to which the present invention is directed. The backup storage system is configured to be a read-only backup storage system most of the time. In this way, a virus or attack on the primary storage server cannot affect the backup storage system because the backup storage system cannot be written to. The backup storage system changes from a read-only backup storage system to a read/write backup storage system only during a backup window of time. It is during the backup window of time that the primary storage server can back up its data volumes. A data volume is an identifiable unit of data storage, which can be a storage device, a portion of a storage device or multiple storage devices in a storage system. The term volume, as it relates to storage, can refer to a physical volume or logical volume. A physical volume is based on storage device, such as a hard disk drive, solid-state drive, compact disc read-only memory, digital video disk, floppy disk, for example. The volume represents a named area of storage that enables users and applications to access the data on the underlying device. Each storage volume is typically configured with a specific file system and is assigned a system-unique or number that identifies the volume. In certain embodiments, the backup volumes of data are in the form of extents that when stored to the backup storage system becomes immutable, which means the data extents cannot be changed or altered in any way. As soon as the backup is completed from the primary storage server, a snapshot of the data extents is taken and stored to a snapshot database in the backup storage system and the backup storage system is returned to a read-only state (i.e., it becomes a read-only backup storage system). If an attack primary storage server is made (or the date on the primary storage server becomes corrupted), primary storage server or some other user data/end-user can read the latest snapshot. The latest snapshot is an assembly of the updated or changed extents that seamlessly and behind the scenes reconstruct most recent generation of data stored to restore the corrupted data on the primary storage server.

FIG. 1 is a block diagram of a storage network environment 100 where embodiments of the present invention can be advantageously practiced. As shown, a primary storage server system 130 is connected to a public cloud 110, a private computer 120 and a backup storage system 150. The public cloud 110 and primary storage server system 130 can be connected via the Internet, pathway 115, at a first end of the primary storage server 134 along with the private computer 120 (a local laptop or nearby server) connected via pathway 125. Certain embodiments provide for the private computer 120 being connected to the primary storage server 130 via a private connection, which is not shown herein. In the present embodiment, the primary storage server system 130 is envisioned connected to the backup storage system 150 via a private/secure connection 140. The primary storage server system 130 in this application is defined as one or more mass digital storage appliances that function as a data receptacle for one or more users of data or entities. Accordingly, as a mass storage appliance, the primary storage server system 130 includes one or more arrays of solid-state drives (SSDs) or hard disk drives (HDDS), or some combination thereof including the computing power to manage the data and communication of other network attached systems. One skilled in the art will appreciate that other kinds of random-access mass storage memory that can be substituted for SSDs or HDDs may be able to equally meet the concepts disclosed herein without departing from the scope and spirit of the present invention. In some embodiments, the primary storage server system 130 is used to store, access, secure and manage digital data, files and services over a shared network or through the Internet. The primary storage server system 130 can specialize in data retrieval and management utilities serving as a central point of access for data storage and access. With this in mind, a storage server system 130 may be accessible by a personal computer (PC) or personal digital device (PDA), such as a cell phone, but does not correspond with a PDA or PC, or other devices in a similar category, despite all of these devices having storage and computing power. The primary storage server system 130 is essentially on a discoverable network whereby one or more private computers 120 or entities over the Internet or by way of the public cloud 110 can see the primary storage server system 130. A skilled artisan will appreciate that a PDA or PC cannot fulfill the storage and computing power of a storage server system (or the backup storage system 150, for that matter), and therefore cannot fulfill a storage server system's purpose. In the present embodiment, the backup storage system 150 is connected to the primary storage server 130 at a second connection end 132 via a private and in some cases a secure communications path 140.

The backup storage system 150 is configured to back up the primary storage server system 100 data. For example, though the primary storage server system 130 may have internal backups, RAID striping, or other redundant storage systems, the backup storage system 150, which is independent from the primary storage server system 130 still offers another layer of storage protection that primary storage server system 130 cannot provide alone. For example, if data volumes on the primary storage server system 130 becomes corrupt, breaks down or altogether disappears, the backup storage system 150 may be the only secure point of recovery of data lost on the primary storage server system 130. In some scenarios, because the primary storage server system 130 is a discoverable storage utility, it is susceptible to being attacked by a malicious virus coming in from the Internet 115, which encrypts or otherwise locks out an end user from using the data on the primary storage server system 130. On the other hand, the backup storage system 150 is attached to the primary storage server system over an undiscoverable network 140, which is known and maintained generally by information technology (IT) people that manage the primary storage server system 130. In this scenario, the backup storage system 150 may be the only location where the data is secure and unharmed by the malicious virus. The backup's storage system 150 is a mass storage appliance that comprises an array of HDD's and or SSD's. Accordingly, the backup storage system 150 is configured and arranged to store volumes of data from the primary storage server, and in some cases the system 150 is configured to mirror the storage primary storage server system 130. In certain configurations, the backup storage system 150 can be purged of all data that is no longer of interest to maintain thereby freeing up space for new backups in the primary storage server system 130. In the present arrangement, the backup storage system 150 is linked to the primary storage server system 130 over a secure undiscoverable (by the outside) communication path or network 140 at a private interface 132 at the primary storage server system 130.

In this particular arrangement 100 and as used herein, the backup storage system 150 is defined as strictly be used for backup operations and managed by IT personnel. The backup storage system 150 is purely a target for dumping data from the primary storage server system 130 and purely exists for data recovery. In contrast, the primary storage server system 130 stores data for end-users 120 either with direct access to the primary storage server system 130 or coming in from the public cloud 110 and therefore operates with a host of applications for managing, altering, protecting, or conditioning data on behalf of the end-user 120. The primary data storage system 130 distinguishes over the backup storage system 150 in that the primary data storage system 130 runs and uses applications that alter data, create new data, and manage backup operations, etc. The backup storage system 150 is merely a target or receptacle that, in terms of user data, receives (i.e., is dumped to) only data "as-is" from the primary storage server system 130. The backup storage system 150 simply receives backup data from the primary storage server 130, retains that data, and reproduces that data to the primary storage server system 130 if ever needed. The backup storage system 150 is only for data recovery if the primary storage server system 130 somehow goes down. And, because the backup storage system 150 is on and undiscoverable connection/network, there is little opportunity for backup storage system 150 to be found and subject to a malicious attack from outside.

Because the backup storage system 150 backs up and maintains copies of volumes in the primary storage server 130, data is secure in case of an emergency data recovery. In one example, the primary storage server system 130 sends data volumes to the backup storage system 150, whether new volumes or full backups, at scheduled times, such as every four hours. Of course, the primary storage server system 130 is typically able to create a backup upon manual intervention as well. Backups can be simple copies of data volumes, files, objects, etc. Some backup techniques leverage simply bundling and compressing files or objects in the primary storage server system 130 and sending the compressed data in a plurality of "hunks" (i.e., discrete object segments, such as 256 KB hunks). Other backup techniques use a base file or base object and map changes thereto providing a good platform for 'snapshots' of data in time. Snapshots provide a reasonably good recovery time objective (RTO), should the primary storage server system 130 somehow go down and the data volumes and needs to be pulled from backup storage system 150.

Figure 2A:
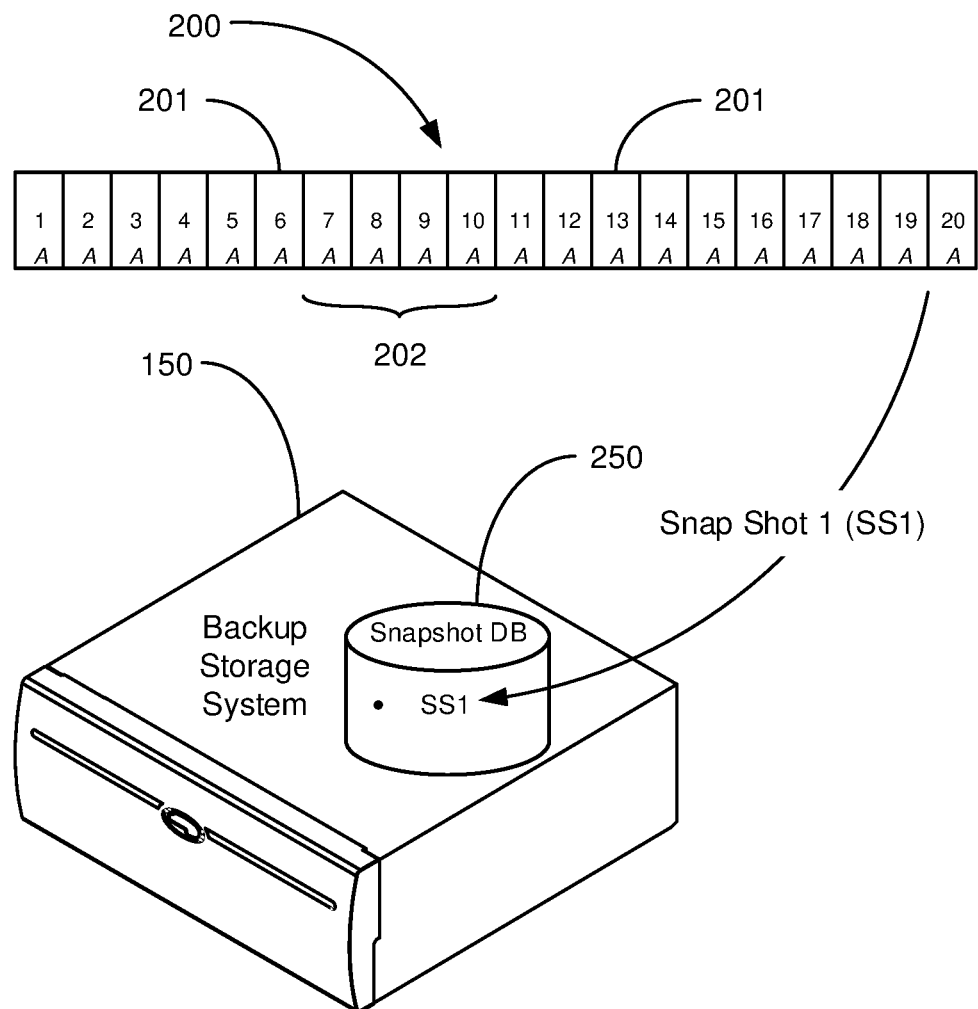
FIGS. 2A-2C are block diagrams that illustratively depicts an exemplary layout of a base logical volume (one or more data objects or files) adapted for snapshots consistent with embodiments of the present invention.
Figure 2B:
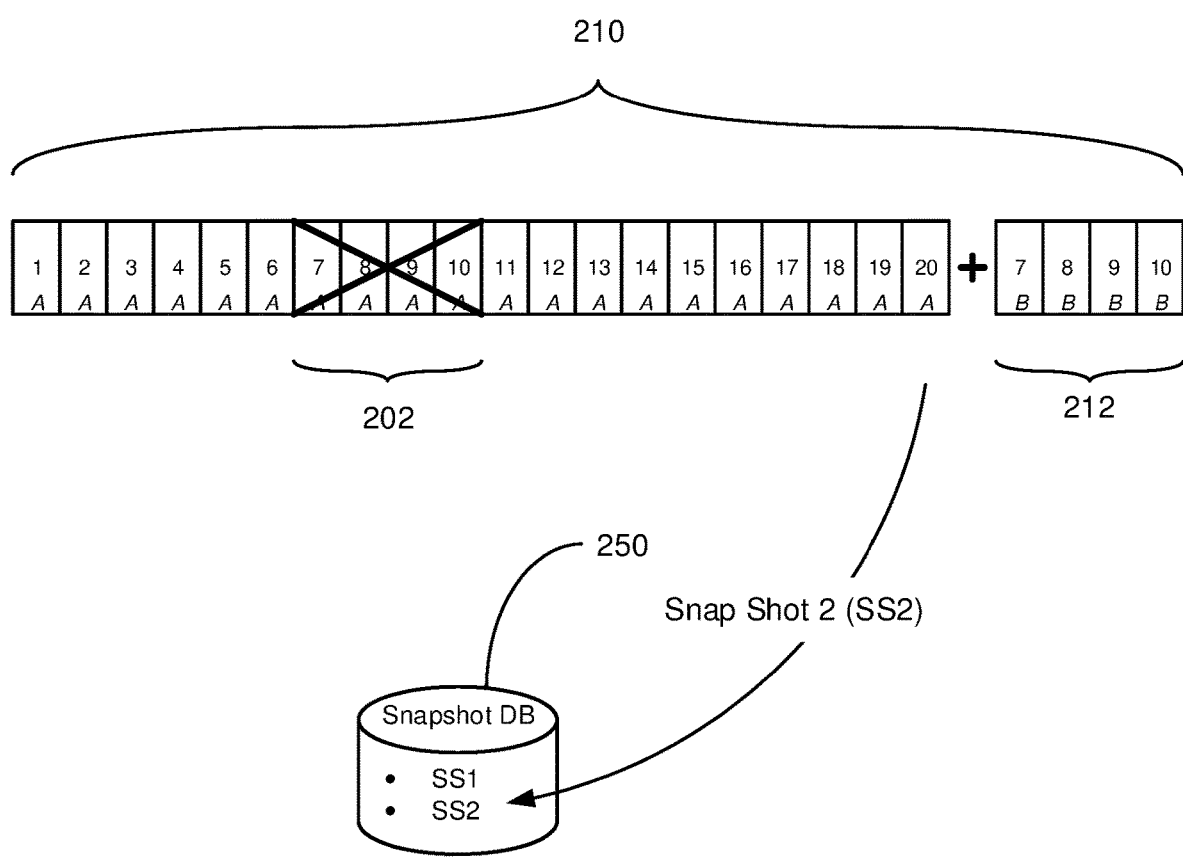
Figure 2C:
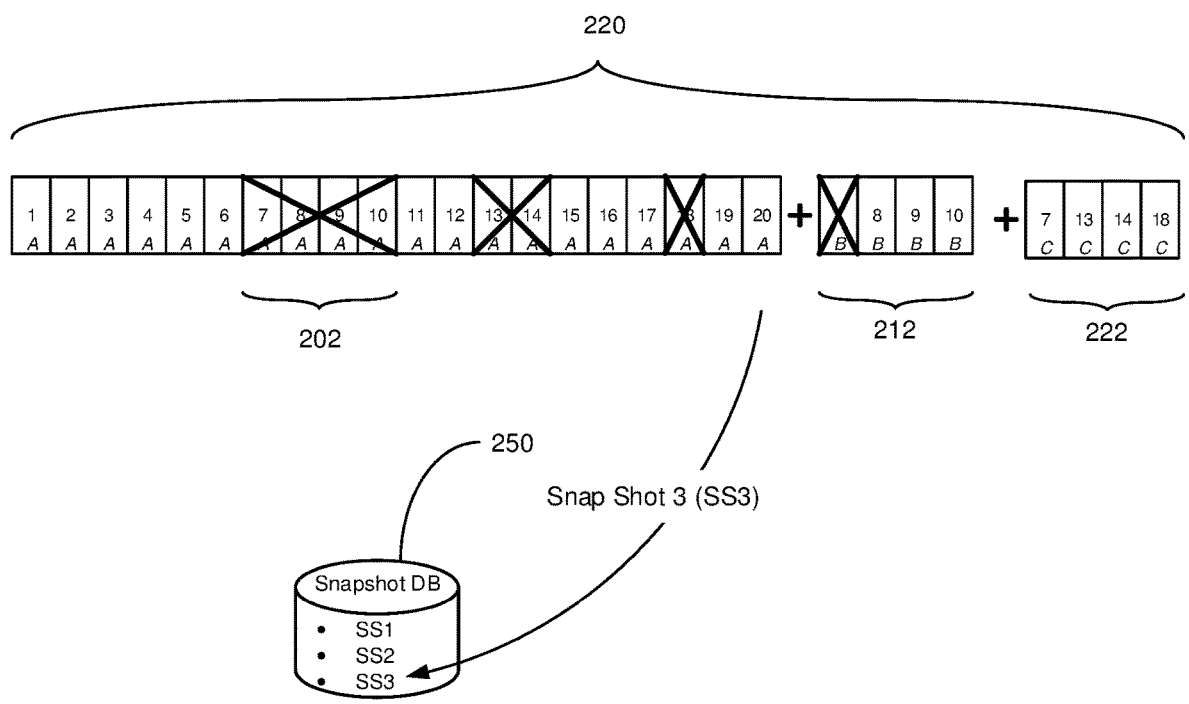

FIGS. 2A-2C are block diagrams that illustratively depicts an exemplary layout of a base logical volume (one or more data objects or files) adapted for snapshots consistent with embodiments of the present invention. FIG. 2A shows the layout of an initially saved base logical volume 200 divided into 20 extents 201, denoted with an "A" indicating that it is a primary/first extent of a newly saved logical volume. In FIG. 2A, extent-6A 201 and extent-13A 201 are called-out by way of example to depict two of the 20 extents. A set of logical volume extents are the elementary blocks of a physical volume, wherein each extent is either wholly unused or wholly used by a particular volume. Extents cannot be subdivided. In the present example, the base logical volume 200 is backed up in the backup storage system 150, such as by way of 20 consecutive (either physically or logically) extends. Once backed up, logical volume 200 is immutable, which means it is a read-only volume that cannot be altered (e.g., written to) in any way. A snapshot #1, SS1, is taken of the base logical volume 200 and maintained in a snapshot database 250 in at least the backup storage system 150. A snapshot is essentially a logical pointer that points to the location of the base logical volume 200. The snapshot SS1 can be taken automatically as soon as the base logical volume 200 is saved in the backup storage system 150, or optionally SS1 can be manually taken. Either way, once the first snapshot SS1 is in the snapshot database 250, an end-user can go to or otherwise access the original/base logical volume 200 by way of the first snapshot SS1. An end-user can be a person, a computer system, the primary storage server system 130 or some other 'consumer of data' that has a need to access the data in the backup storage system 150.

In the present embodiment, the backup storage system 150 goes into a read-only state after taking the first snapshot SS1, whereby data can be read from the backup storage system 150. Nothing can be written to the backup storage system 150 when the backup storage system 150 is in a read-only state. This protects the backup storage system 150 from a malicious attack that may try to enter the backup storage system 150 by way of the primary storage server system 130 between the necessary data backups. The backup storage system 150 goes into a read-only state for a predetermined amount of time between schedule backups for the primary storage server system 130. For example, the backup storage system 150 may go into a read-only state for four hours, and then open to a read/write state to receive a backup from the primary storage server system 130. Once the backup primary storage server system 130 is finished its schedule backup, a second snapshot SS2 is taken. Essentially immediately after the second snapshot SS2 is taken, the backup storage system 150 goes back into a read-only state until the next scheduled backup to minimize the possibility of malicious attack coming in from the primary storage server system 130. As should be appreciated, the backup storage system 150 is exposed to a malicious attack coming in through the primary storage server system 130 during the schedule backup when the backup storage system 150 is in a read/write mode.

At a predetermined amount of time after the original backup and snapshot of the base logical volume 200 and the first snapshot SS1, the backup storage system 150 opens itself up to read/write operations from the primary storage server system 130. Only the changed extents 212 of the base logical volume 200 are sent to the backup storage system 150 where the changed extents 212 logically replace the original corresponding extents 202 (7A-10A). Once the backup is done, a second snapshot SS2 is taken of the changed extents 212 along with the base logical volume 200. Hence, the second snapshot SS2 is of the changed extents 212, which replace the original corresponding extents 202, that can be stitched together with the remaining base logical volume 200 to provide the updated generation of the data volume 210. For example, as shown in FIG. 2B, the logical volume 200 is rewritten in the time since the original backup storage event with next extents 212, which replace original subgroup of extents 202. Specifically, only the subgroup of extents 7A, 8A, 9A and 10A are rewritten and therefore only the newly written subgroup of extents 212 (extents 7B, 8B, 9B and 10B) are added to the backup storage system 150, which can be appended to the base logical volume 200. The new subgroup of extents 212 replace the original subgroup of extents 202 as shown by the 'X' through the original subgroup of extents 202. The newly written subgroup of extents 212 are denoted with a "B" indicating that these extents 212 are a second set of extents in the logical volume. After storing the new (second generation) extents 212, a second snapshot SS2 is taken of the newly changed logical volume 210 and stored in the snapshot database 250, as shown. In certain embodiments, the new snapshot SS2 points to the second-generation extents 212, which then points to the base logical volume 200 with the original extents 202 to be replaced. Hence, in this embodiment, SS2 builds the appropriate second-generation volume with the change on-the-fly (assembling the second-generation volume with little or no time lost compared with recalling the data if it were in one continuous piece). Once the second snapshot SS2 is taken, the backup storage system 150 goes into a read-only mode until the predetermined amount of time for new backup has lapsed. Alternatively, the new (second) snapshot SS2 is only of the new subgroup of extents 212 and the second-generation volume 210 can be reassembled via pointers and extents substitution behind-the-scenes.

FIG. 2C is a block diagram continuing from FIG. 2B at a point in time (where the backup storage system 150 switches from a read-only device to a read/write device) for a third backup. In this example, a third generation of extents "C" have been changed to form the latest generation of the logical volume 220. Accordingly, new third generation extents 7C, 13C, 14C and 18C 222 are written to the backup storage system 150 and logically appended to the base logical volume 200 and second-generation extents 212. Once the backup is complete, a third snapshot SS3 is taken of the point in time when the third-generation extents 222 are written. As shown, new extent 7C replaces 7B and new extents 13C, 14C, 18C replace 13A, 14A and 18A.

Figure 3:
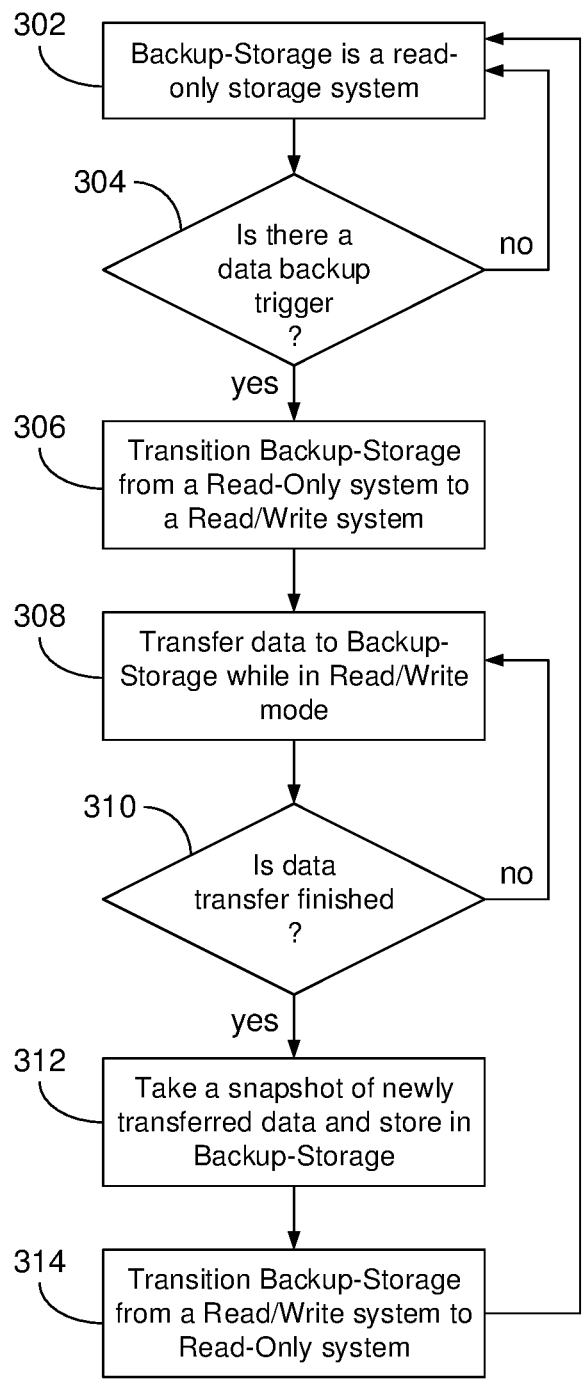
FIG. 3 is a block diagram flow chart of a method to protect data in a backup storage system/server consistent with embodiments of the present invention.
Figure 4:
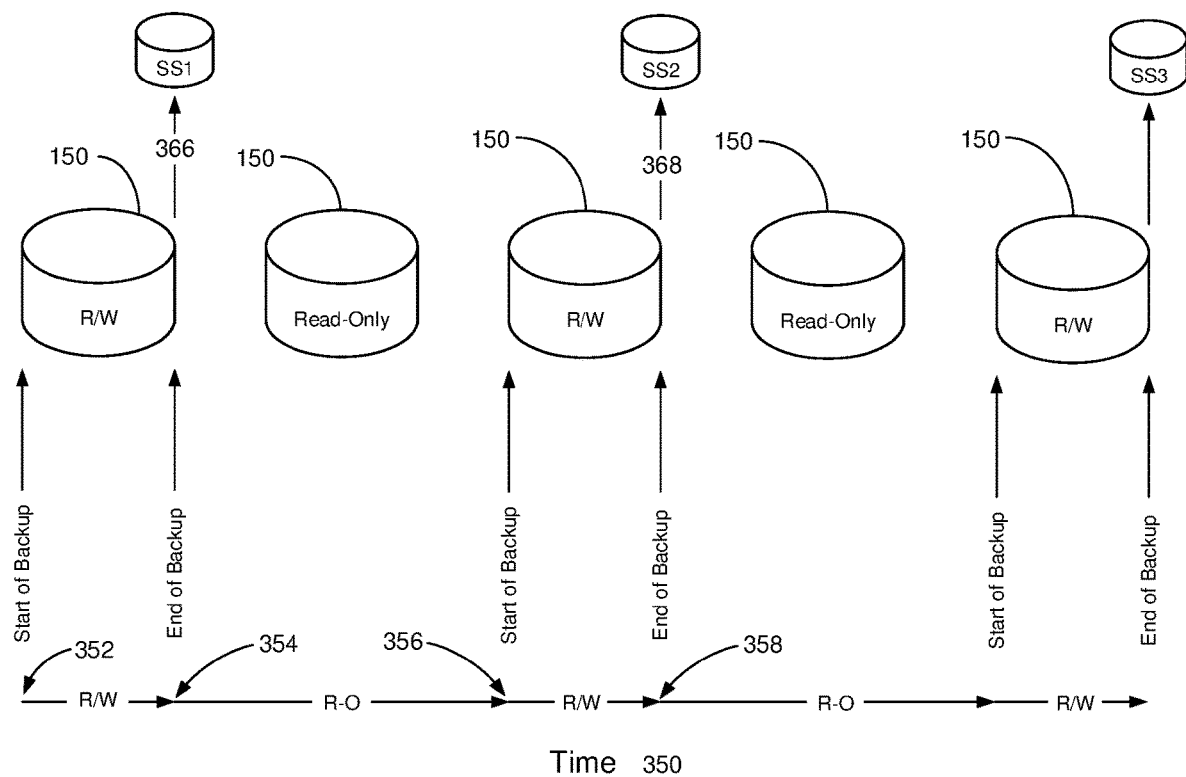
FIG. 4 is a block diagram of a backup storage system going in and out of protective mode consistent with embodiments of the present invention.

FIG. 3 is a block diagram flow chart of a method to protect data in a backup storage system/server consistent with embodiments of the present invention. FIG. 3 is presented in view of FIGS. 1 and 4. Whenever the backup storage system 150 is not doing a backup operation for the primary storage server system 130, the backup storage system 150 is a read-only storage system, meaning data cannot be written to it but only read from it, step 302. In the present embodiment, the data backup trigger occurs after a predetermined amount of time in read-only mode has lapsed (for example after four hours). Other embodiments contemplate a data backup trigger being a manual toggle, or switch, to unlock the backup storage system 150 from a read-only system to a read/write system. Hence, the question block 304 looks to see if the backup trigger has been activated. If no, keep the backup storage system 150 as a read-only storage system. If yes, transition backup storage system 150 from a read-only storage system to a read/write storage system. This is shown in FIG. 4 at starting point 352 along the timeline 350. Note, the backup storage system 150 is shown as a read/write storage system volume during the start of the backup 352 to the end of the backup 354. Backup data from the primary storage server system 130 is moved to the backup storage system 150 during this read/write window, step 308. Decision step 310 questions if the data transfer operation is complete. If not, continue transferring the data holding the backup storage system 150 in the read/write mode. If completed, take a first snapshot SS1 of the newly transferred data in storage in the backup storage system 150 and put the first snapshot SS1 in the snapshot database 250, step 312. This is triggered at the end of the read/write window 354 and is shown by the upward arrow pointing to SS1 366. As soon as the first snapshot SS1 is taken, the backup storage system 150 goes back into the read-only mode, step 314 and stays as a read-only system, step 302, until there is a backup trigger again, step 304. This is also depicted in FIG. 4 from the time period between 354 and 356. After the read-only time has elapsed and it is time to start another backup, the backup storage system 150 transitions into a read/write mode 358 and, once again, backs up data for the primary storage server system 130. Upon completion of the backup operation, a second snapshot SS2 368 is triggered and the backup storage system 150 transitions back to a read-only system 150 at timeline 358. The steps are repeated again and again. In this way, if an attempt to attack the backup storage system 150 is made, it must be done during the relatively short read/write window.

Certain embodiments contemplate a backup prediction routine running in the backup storage system 150, which over time can build a backup trend of the amount of data and the types of data changes that generally occur at each backup event. The backup trend is envisioned to provide an estimate of the amount of data changed and perhaps the type of data changed, or the number and location of the extents changed or added (such as new extents 21-25 added to the base volume 200, for example). If there is an attack on the primary storage server system 130 corrupting the data thereon, there may be a significant change to the data in the primary storage server system 130. Upon attempting to transfer the corrupted data during a routine backup operation, the backup storage system 150 may be able to detect the corrupted data based on the data being an outlier in the backup trend. The backup storage system 150 can warn an end-user that the data about to be transferred is suspicious question whether or not they want to proceed. In other words, a significant change in the data being backed up could prompt a warning and thereby prevent the propagation of corrupted data.

Figure 5A:
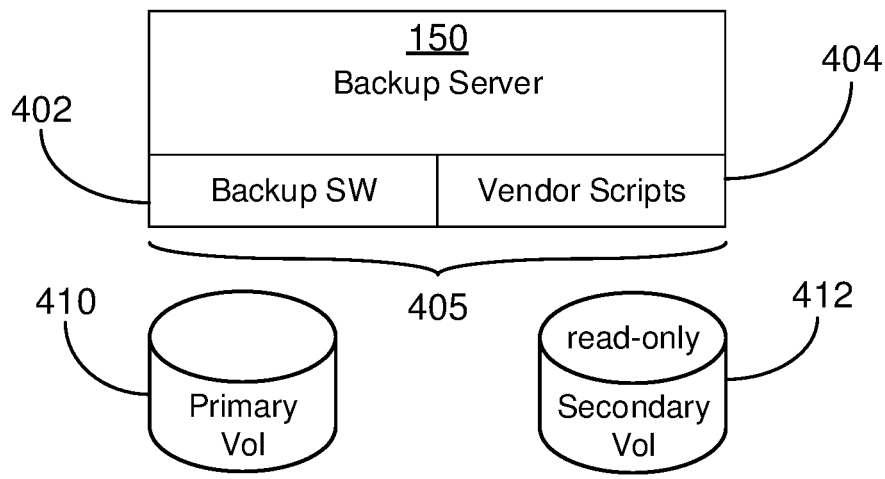
FIGS. 5A-5E are line drawings of another example of a backup routine consistent with embodiments of the present invention.

As shown in FIGS. 5A-5E, depict another example of a backup routine consistent with embodiments of the present invention. FIG. 5A depicts an initial state of a backup server system 150 having access to a primary storage volume 410 and a secondary storage volume 412 (that is in an initial read-only state). The primary storage volume 410 being used by or otherwise accessed by an enterprise's business applications, which include the backup software 402 and the vendor scripts 404. The backup server 150 copies data from the primary storage volume 410 and stores it to the secondary storage volume 412 at specific points of time (considered backing up herein). The amount of time that this copy operation requires is known as the backup window. Modern backup software, which can be one embodiment of backup software 402, attempts to reduce this window through techniques such as compression and deduplication in conjunction with relegating the backup to incremental changes that have occurred on the primary volume 410, for example see the changed extents 212 replacing original extents 202 of FIG. 2B. Given these techniques backups can be performed more frequently with less data being transferred to the secondary storage volume 412 resulting in the secondary storage volume 412 being idle most of the time. Putting the secondary storage volume 412 in a read-only state during this idle time cuts down on a potential exposure that ransomware attacks can occur. The trigger for transitioning the secondary volume 412 from a "writable" to a "read-only" state is initiated from the backup application 405 once it has completed a backup. This is done by the backup software 402 sending a transition command (transitioning from "writable" to a "read-only") to the secondary storage volume 412. The transition command can be initiated directly by the backup software 402 or by the backup software that is triggered by a vendor provided script 404 that runs or is otherwise executed at the end of each backup. Additionally, a snapshot command is also sent that instructs the secondary storage volume 412 create an immutable snapshot of the primary storage volume 410 at that time. These snapshots can then be used to recover the secondary volume 412 back to a point in time that a backup was completed.

Figure 5B:
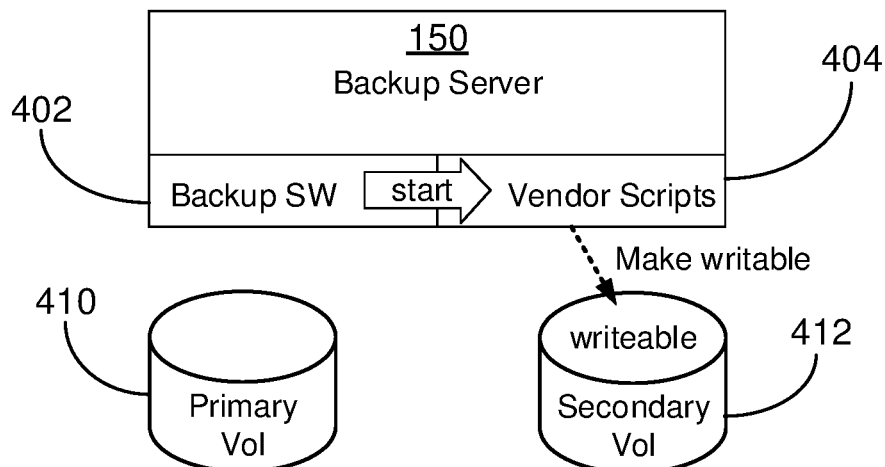

FIG. 5B depicts the vendor scripts 404 instructing the secondary volume 412 to transition from a read-only state to a writeable state readying the secondary volume 412 to start a backup operation. The vendor scripts 404 can provide the instructions for the transition command based on time elapsed, manual, or automated authorization to do so, just to name a couple of examples to start the backup operation.

Figure 5C:
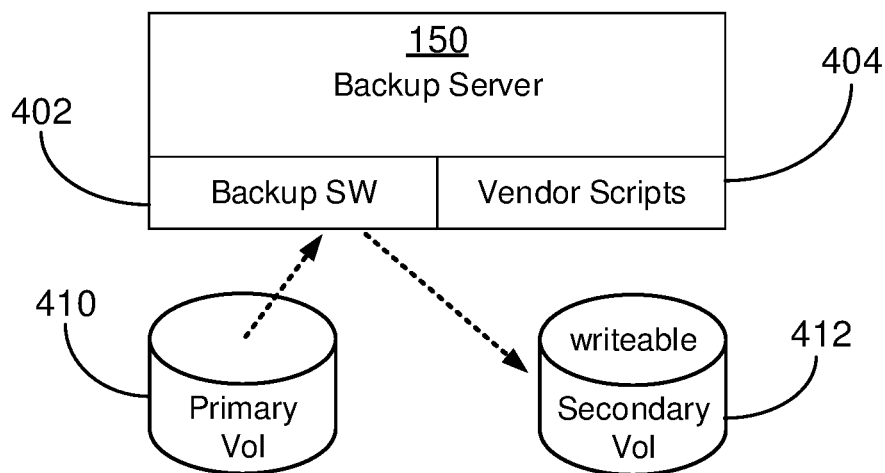

FIG. 5C depicts the backup software performing the backup operation now that the secondary volume 412 is in a writeable state. This can be done for full volumes or changed extents, as discussed earlier.

Figure 5D:
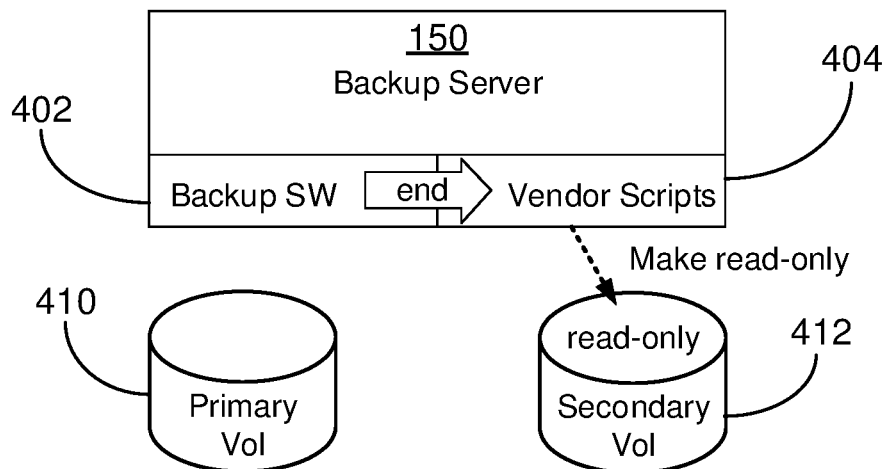

FIG. 5D depicts the backup being completed with the vendor scripts 404 instructing the secondary volume 412 to transition from the writeable state to the read-only state. In other words, as soon as the backup operation is completed the secondary volume 412 goes back into a read-only state to limit exposure of a malicious attack.

Figure 5E:
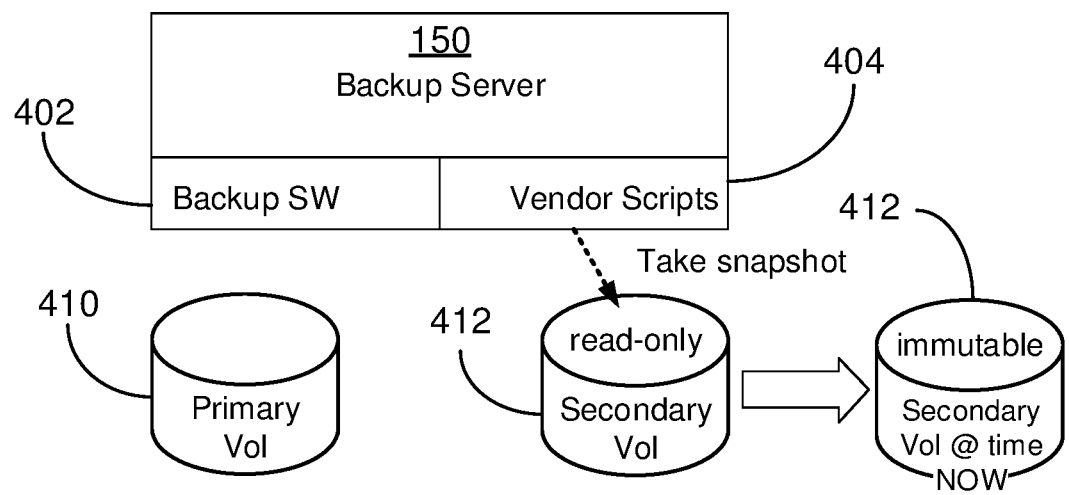

FIG. 5E depicts the backup completed step 2, wherein the secondary volume 412 is immutable, which means it cannot be altered in any way. A snapshot is taken of the secondary volume 412 at the point in time when the backup is complete (NOW). The snapshot is maintained in the event the primary volume 410 needs to be rebuilt.

With the present description in mind, below are some examples of certain embodiments illustratively complementing some of the methods and apparatus embodiments discussed above and presented in the figures to aid the reader. The elements called out below are provided by example to assist in the understanding of the present invention and should not be considered limiting. The reader will appreciate that the below elements and configurations can be interchangeable within the scope and spirit of the present invention.

In that light, certain embodiments contemplate a method for using a backup server 150 with a primary server 130, the method embodiment starting with the backup server 150 storing a base backup volume of data 200 from the primary server 130 at a first scheduled time. The backup server 150 takes a first snapshot SS1 of the base backup volume of data 200 each place and then stores a first volume change 210, which is a first change to the base backup volume of data 200, as received from the primary server 130 at a second scheduled time. The backup server 150 then takes a second snapshot SS2 of the first volume change 210. The backup server 150 is unable to be written to between the first scheduled time in the second schedule time. The base backup volume 200 and the first volume change 210 is immutable as soon as they are written to the backup server 150.

The method for using a backup server 150 with a primary server 130 further imagining the backup server 150 being a read-only backup storage device from immediately after taking the first snapshot SS1 to immediately before the second scheduled time. This can further include wherein the backup server 150 is a read/write backup storage device defined from immediately after the second scheduled time to immediately after taking the second snapshot SS2.

The method for using a backup server 150 with a primary server 130 further contemplating the backup server 150 being connected to the primary server 130 over a private undiscoverable connection. Optionally, the private undiscoverable connection can be a secure connection that is not known outside of the primary storage server system 130.

The method for using a backup server 150 with a primary server 130 further contemplated to comprise running a backup prediction routine that statistically builds a backup trend from the first volume change and all other volume changes. This could be used for an end user if a pending volume change deviates beyond a threshold value of the backup trend. The threshold value could be within pre-defined margins of what one would expect would be a reasonable deviation, such as +/−20% change in data for example of +20% more changed extents than yet seen. Or at least 5 newly changed extents once a trend is established, just to name several examples.

The method for using a backup server 150 with a primary server 130 further contemplating storing a plurality of consecutive progressive volume generations, each comprising a volume change to the backup server, wherein each of the consecutive volume changes comprises a corresponding snapshot SSN, each of the consecutive volume changes is stored to the backup server 150 at a corresponding backup time, wherein volume generation is the base backup volume of data 200 altered with all preceding volume changes. This method could further comprise recalling one of the volume generations from the corresponding snapshot SSN. This could further be where the volume generation is transferred to the primary server.

The method for using a backup server 150 with a primary server 130 is further imagined wherein the base backup volume of data 200 is divided into a plurality of equal extents 201 and the first volume change 210 comprises an extent subgroup 212 of the extents 201 that logically replace and corresponding base extent subgroup 202. This method could further comprise only storing the extent subgroup 212 to the backup server 150 during the second scheduled time.

The method for using a backup server 150 with a primary server 130 is further contemplated to comprise a prevent delete snapshot command that prevents deleting either the first snapshot SS1 or the second snapshot SS2.

In yet another embodiment of the present invention, a secure backup method is envisioned to comprise switching a backup storage appliance 150 from being a read-only appliance to being a read/write appliance, the backup storage appliance 150 is the read/write appliance for a designated backup window of time. The method continues with storing a backup copy of a generation-1 data volume 200 in the backup storage appliance 150 only during the designated backup window of time 352-354, the generation-1 data volume 200 is divided into a plurality of extents, the backup copy received from a primary storage server system 130. A first snapshot SS1 is taken of the generation-1 data volume 200 essentially immediately upon completion of the storing step. The first snapshot SS1 is maintained in a snapshot database in the backup storage appliance 150. Immediately after the taking step, the backup storage appliance 150 is switched to being the read-only appliance. After a predesignated amount time, the backup storage appliance 150 is switched from being the read-only appliance to being the read/write appliance and retaining only changed extents from the plurality of extents in the backup storage appliance 150, the changed extents correspond to extents from the generation-1 data volume 200. A second snapshot SS2 is taken of the changed extents and maintaining the second snapshot SS2 in the snapshot database, the backup storage appliance 150 is independent from and spaced away from a primary storage server system 130. By independent and spaced away from it is meant that the backup storage appliance 150 is not part of or in the same housing as the primary storage server system 130 and the backup storage appliance 150 is separated from the primary storage server system 130 by an air gap.

The secure backup method is further envisioned wherein the backup storage appliance 150 is connected to the primary storage server system 130 over an undiscoverable private connection.

The secure backup method can further comprise the primary storage server system 130 recalling the SS2 wherein the backup storage appliance 150 provides a generation-2 data volume 210 that comprises a stitched together version of the generation-1 data volume 200 but with the changed extents replacing corresponding extents from the generation-1 data volume 200. This can further be wherein the recalling step is initiated after corrupted data is discovered in the primary storage server system 130.

The secure backup method also envisions the snapshots SS1 and SS2 not being able to be deleted.

The secure backup method further considering an option wherein the generation-1 data volume 200 and the changed extents are immutable.

Still, another embodiment of the present invention envisions a backup system 100 that includes at a first end 132, a primary storage server system 130 connected to a backup storage appliance 150 via a private undiscoverable connection connected, the primary storage server system 130 connected to a public network at a second end 134. Here, the backup storage appliance 150 is in possession of a generation-1 data volume 200 that comprises a sequence of primary extents. The sequence includes a first set of changed extents corresponding to a first subset of the primary extents, and a second set of changed extents corresponding to a second subset of either the primary extents, a subset of the changed extents, or a combination of the second subset of either the primary extents and the subset of the changed extents. The system 100 also includes a snapshot database 250 in the backup storage appliance 150 comprising a first snapshot SS1 of the primary extents, a second snapshot SS2 of the subset of the first set of changed extents, and a third snapshot SS3 of the second set of changed extents, the extents from only the primary storage server system 130. The backup storage appliance 150 is only capable of storing the extents and taking the snapshots during scheduled read/write periods of time, between the scheduled read/write periods of time, the backup storage appliance 150 is a read-only backup storage appliance.

The above embodiments are not intended to be limiting to the scope of the invention whatsoever because many more embodiments are easily conceived within the teachings and scope of the instant description. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a backup storage system 150 could provide computing power like a storage server system 130, the computing power in the backup storage system 150 is not used and will never be used like a primary storage server system 130 because the backup storage system 150 is merely a storage receptacle the backup post condition data from the primary storage server system 130. Also, though the primary storage server system 130 is shown to be a single storage cabinet, the storage server system 130 could equally be a building housing a plurality of primary storage servers and the backup storage system could have equal or greater storage capacity than the primary storage server system while still maintaining substantially the same functionality without departing from the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A method comprising: providing a base volume of data; dividing the base volume of data into a plurality of equal sized base volume extents that includes a first base volume extent; taking a first snapshot SS1 of the plurality of equal sized base volume extents; storing the first snapshot SS1 in non-transient data storage memory; modifying the base volume of data by modifying the first base volume extent (first modified extent); taking a second snapshot SS2 of only the first modified extent; and from the first snapshot SS1 and the second snapshot SS2, generating a copy of the modified volume by recalling the plurality of equal sized base volume extents but replacing the first base extent with the first modified extent.

2. The method of claim 1 further comprising a second base volume extent of the plurality of equal sized base volume extents, altering the modified volume of data by modifying the second base volume extent; taking a third snapshot SS3 of only the modified second base volume extent; and from the SS1, the SS2 and the SS3, generating a copy of the altered volume of data by recalling the plurality of equal sized base volume extents but replacing the first base extent with the first modified extent and the second base volume extent with the modified second base volume extent.

3. The method of claim 1, wherein the base volume is transmitted from a primary server to a backup server and the dividing step, the taking steps, the storing steps, and the modifying steps are performed in the backup server.

4. The method of claim 3, wherein the backup server is a read-only server immediately after taking the first snapshot SS1 and only becomes a read and write server at a scheduled time after being a read-only server.

5. The method of claim 3, wherein the backup server is connected to the primary server via a private undiscoverable connection.

6. The method of claim 5, wherein the private undiscoverable connection is a secure connection that is not known outside of the primary server.

7. The method of claim 1 further comprising running a backup prediction routine that statistically builds a backup trend from a first volume change and all ensuing volume changes.

8. The method of claim 7 further comprising warning an end user if a pending volume change deviates beyond a threshold value of the backup trend.

9. The method of claim 3 further comprising storing a plurality of consecutive progressive volume generations, each comprising a volume change to the backup server, wherein each of the consecutive volume changes comprises a corresponding snapshot SSN, each of the consecutive volume changes is stored to the backup server at a corresponding backup time, wherein volume generation is the base backup volume of data altered with all preceding volume changes.

10. The method of claim 9 further comprising recalling one of the volume generations from the corresponding snapshot SSN.

11. The method of claim 3 further comprising only storing extents corresponding to snapshot SSNs in the backup server.

12. The method of claim 1 further comprising a prevent delete snapshot command that prevents deleting the first snapshot SS1 and the first modified extent and any later snapshots and their corresponding extents.

13. A method for storing data in snapshots, the method comprising:
dividing a primary volume of data into a plurality of equal sized base volume extents;
taking a first snapshot SS1 of the base volume extents;
storing the first snapshot SS1 and the base volume extents in non-transient data storage memory;
altering the primary volume of data by modifying a portion of the primary volume of data;
identifying a subset of the base volume extents that corresponds to the portion;
designating a subset of modified volume extents corresponding to the subset of the base volume extents;
taking a second snapshot SS2 of only the subset of the modified volume extents; and
storing the second snapshot SS2 and the subset of the modified volume extents in the non-transient data storage memory.

14. The method of claim 13 further comprising storing the base volume extents in the non-transient data storage memory.

15. The method of claim 13 further comprising generating a copy of the altered primary volume of data, from the SS1 and the SS2, by recalling the plurality of equal sized base volume extents with the subset of the modified volume extents replacing the subset of the base volume extents.

16. The method of claim 13, wherein the non-transient data storage memory is in a backup server and the primary volume of data was received from a primary server.

17. The method of claim 13, further comprising running a backup prediction routine that statistically builds a backup trend from the SS2 and all ensuing snap shots.

18. The method of claim 17 further comprising warning an end user if a pending volume change deviates beyond a threshold value of the backup trend.

19. A method for storing data extents using data extent snapshots, the method comprising:
- providing a primary volume of data divided into a plurality of equal sized base volume extents (base volume extents);
- storing a first snapshot SS1 of the base volume extents along with the base volume extents in non-transient memory; and
- storing a second snapshot SS2 of only a subset of modified volume extents corresponding to a subset of the base volume extents along with the subset of modified volume extents in the non-transient memory, the subset of the base volume extents is from an altered portion of the primary volume.

20. The method of claim 19, further comprising changing the primary volume with the altered portion of the primary volume but generating a copy of the changed primary volume from the SS1 and the SS2, by recalling the base volume extents with the subset of the modified volume extents replacing the subset of the base volume extents.

* * * * *